(12) United States Patent
Kilgard et al.

(10) Patent No.: US 9,342,891 B2
(45) Date of Patent: May 17, 2016

(54) STENCIL THEN COVER PATH RENDERING WITH SHARED EDGES

(71) Applicant: NVIDIA CORPORATION, Santa Clara, CA (US)

(72) Inventors: Mark J. Kilgard, Austin, TX (US); Jeffrey A. Bolz, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 262 days.

(21) Appl. No.: 14/028,421

(22) Filed: Sep. 16, 2013

(65) Prior Publication Data

US 2014/0267375 A1    Sep. 18, 2014

Related U.S. Application Data

(60) Provisional application No. 61/799,948, filed on Mar. 15, 2013.

(51) Int. Cl.
| | |
|---|---|
| *G06T 1/20* | (2006.01) |
| *G06T 11/40* | (2006.01) |
| *G06T 7/00* | (2006.01) |
| *G06T 3/00* | (2006.01) |
| *G09G 5/02* | (2006.01) |
| *G09G 5/39* | (2006.01) |

(52) U.S. Cl.
CPC ............. *G06T 7/0079* (2013.01); *G06T 3/0012* (2013.01); *G06T 11/40* (2013.01)

(58) Field of Classification Search
CPC combination set(s) only.
See application file for complete search history.

(56) References Cited

U.S. PATENT DOCUMENTS

| | | | |
|---|---|---|---|
| 5,287,438 A | 2/1994 | Kelleher | |
| 6,057,855 A * | 5/2000 | Barkans | 345/629 |
| 6,717,577 B1 * | 4/2004 | Cheng et al. | 345/419 |
| 7,446,780 B1 * | 11/2008 | Everitt et al. | 345/611 |
| 7,502,035 B1 * | 3/2009 | Moreton | 345/611 |
| 7,564,456 B1 | 7/2009 | Lindholm | |
| 8,237,738 B1 | 8/2012 | Crow | |

(Continued)

FOREIGN PATENT DOCUMENTS

TW    1297441 A    6/2008

OTHER PUBLICATIONS

Kilgard, M.J. et al.: GPU-accelerated Path Rendering. ACM transactions on graphics, vol. 31, Article 172, Nov. 2012, p. 172:1 to 172:10.

*Primary Examiner* — Wesner Sajous
(74) *Attorney, Agent, or Firm* — Artegis Law Group, LLP

(57) ABSTRACT

One embodiment of the present invention includes techniques for rasterizing primitives that include edges shared between paths. For each edge, a rasterizer unit selects and applies a sample rule from multiple sample rules. If the edge is shared, then the selected sample rule causes each group of coverage samples associated with a single color sample to be considered as either fully inside or fully outside the edge. Consequently, conflation artifacts caused when the number of coverage samples per pixel exceeds the number of color samples per pixel may be reduced. In prior-art techniques, reducing such conflation artifacts typically involves increasing the number of color samples per pixel to equal the number of coverage samples per pixel. Advantageously, the disclosed techniques enable rendering using algorithms that reduce the ratio of color to coverage samples, thereby decreasing memory consumption and memory bandwidth use, without causing conflation artifacts associated with shared edges.

22 Claims, 10 Drawing Sheets

(56) References Cited

U.S. PATENT DOCUMENTS

| | | | |
|---|---|---|---|
| 8,390,645 B1 * | 3/2013 | Crow et al. | 345/613 |
| 8,947,444 B1 * | 2/2015 | Hakura et al. | 345/522 |
| 2003/0095134 A1 * | 5/2003 | Tuomi et al. | 345/611 |
| 2011/0285711 A1 | 11/2011 | Kilgard | |
| 2012/0281004 A1 * | 11/2012 | Shebanow et al. | 345/557 |

* cited by examiner

STENCIL THEN COVER PATH RENDERING WITH SHARED EDGES

CROSS-REFERENCE TO RELATED APPLICATIONS

This application claims benefit of the U.S. provisional patent application having Ser. No. 61/799,948 and filed on Mar. 15, 2013. The subject matter of this related application is hereby incorporated herein by reference.

BACKGROUND OF THE INVENTION

1. Field of the Invention

Embodiments of the present invention relate generally to graphics processing and, more specifically, to stencil-then-cover path rendering with shared edges.

2. Description of the Related Art

Path rendering is a style of resolution-independent 2-dimensional rendering, often called "vector graphics," that is the basis for a number of important rendering standards. Those standards include Postscript, Java 2D, Apple's Quartz 2D, OpenVG, PDF, TrueType fonts, OpenType fonts, PostScript fonts, HTML 5 Canvas, Scalable Vector Graphics (SVG) web format, Microsoft's Silverlight and Adobe Flash for interactive web experiences, Microsoft's XML Specification (XPS), drawings in Office file formats including PowerPoint, Adobe Illustrator illustrations, and more.

In path rendering, a software application typically specifies a scene as a sequence of resolution-independent outlines, known as paths, that may be painted with constant colors, linear or radial gradients, or images. Many graphics processing units (GPUs) support rendering such paths through a two-pass rendering process known as "stencil-then-cover." First, in a path stenciling pass, the GPU generates a stencil buffer that indicates which samples (i.e., positions within each pixel) are covered by the path. Second, in a path covering pass, the GPU generates cover geometry for the path and shades the cover geometry with stencil testing enabled. Typically, the GPU implements the cover geometry with some sort of conservative bounding geometry, such as a bounding box (i.e., two triangles), a convex hull, or a similar construct. Because stencil testing is enabled during the path covering pass, the GPU discards any fragments that are not covered by the path and writes the surviving fragments to the color buffer as processed graphics data.

In some approaches to stencil-then-cover path rendering, the GPU maintains N coverage samples per pixel and M color samples per pixel, where N is greater than M. In operation, the GPU determines the coverage of the path at N coverage samples per pixel. Then, during the path covering pass, before the GPU performs blending and color write operations, the GPU reduces the number of coverage samples to the number of color samples. Notably, during this reduction operation, the GPU may select a group of N/M coverage samples associated with a single color sample and generate an opacity value for the color sample based on the proportion of the N/M coverage samples that are covered. One limitation of this rendering approach is that reducing groups of multiple coverage samples to single color samples may introduce conflation artifacts at edges that are shared between different paths. In particular, the reduction operation conflates the boolean concept of coverage with a fractional value for opacity.

For example, suppose that there were 4 coverage samples corresponding to each color sample (N=4 and M=1), the background color were blue, and the GPU were to be configured to render a yin-yang symbol—yin portion first. Further, suppose that the yin portion of the symbol were yellow, the yang portion of the symbol were green, and the yin and yang portions were to share an edge at the boundary between the two portions. Finally suppose that two of the coverage samples associated with a particular color sample were covered by the yellow yin portion of the symbol, and two of the coverage samples associated with the particular color sample were covered by the green yang portion of the symbol. Upon rendering the yin portion of the symbol, the GPU would assign an intermediate blue-tinged color to the particular color sample—a blend of 50% of the yellow color associated with the yin portion of the symbol and 50% of the blue color associated with the background. Subsequently, upon rendering the yang portion of the symbol, the GPU would assign a different blue-tinged color to the particular color sample—a blend of 50% of the green color associated with the yang portion of the symbol and 50% of the intermediate blue-tinged color. Such background color bleeding would degrade the quality of the displayed image. In particular, a fraction of the blue background color would be visible at the boundary between the yin and yang portions of the yin-yang symbol (as if there were a gap between the yin and yang portions of the yin-yang symbol.)

In one approach to reducing the conflation artifacts associated with edges shared between different paths, the number of color samples is increased to match the number of coverage samples. In such implementations, the coverage is maintained separately for each color sample as a Boolean value and is not conflated with opacity. Consequently, rendering scenes that include edges that are shared between different paths does not introduce conflation artifacts attributable to these shared edges. However, increasing the number of color samples increases both the memory consumption and the memory bandwidth used by the color buffer. Because both the local memory capacity of GPUs and the associated memory bandwidth is limited, any increase in either memory consumption or memory bandwidth use is generally undesirable.

Accordingly, what is needed in the art is a more effective approach to rendering edges that are shared between different paths.

SUMMARY OF THE INVENTION

One embodiment of the present invention sets forth a method for rasterizing graphics primitives. The method includes determining a rasterization state associated with a first edge of a graphics primitive, selecting a first sample rule from multiple sample rules based on the rasterization state, determining whether a first coverage sample is considered to be inside the first edge based on the first sample rule, and determining whether the first coverage sample is considered to be covered by the graphics primitive based on whether the first coverage sample is considered to be inside the first edge.

One advantage of the disclosed approach is that a processing unit may perform memory-efficient path rendering operations without introducing conflation artifacts that may be associated with edges that are shared between different paths. Because the rasterizer unit considers each group of coverage samples associated with a particular color sample to be either fully inside or fully outside each shared edge, the number of coverage samples per pixel may exceed the number of color samples without causing background bleeding in the displayed image. Consequently, the processing unit does not incur the increased memory consumption and memory bandwidth associated with prior-art techniques in which the number of color samples is increased to match the number of coverage samples.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
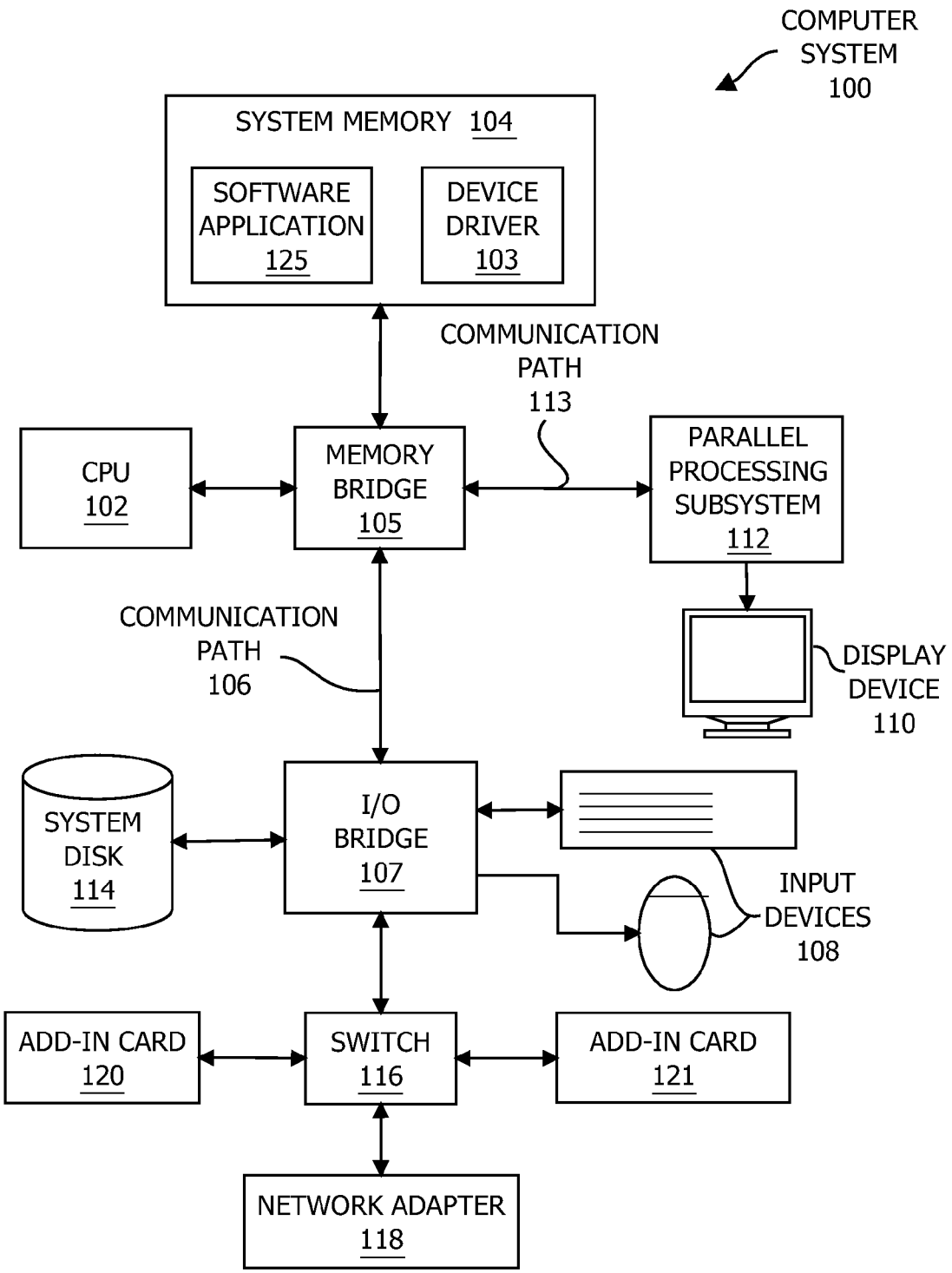
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbrige chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112. The system memory 104 also includes a software application 125 that executes on the CPU 102 and may issue commands that control the operation of the PPUs.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
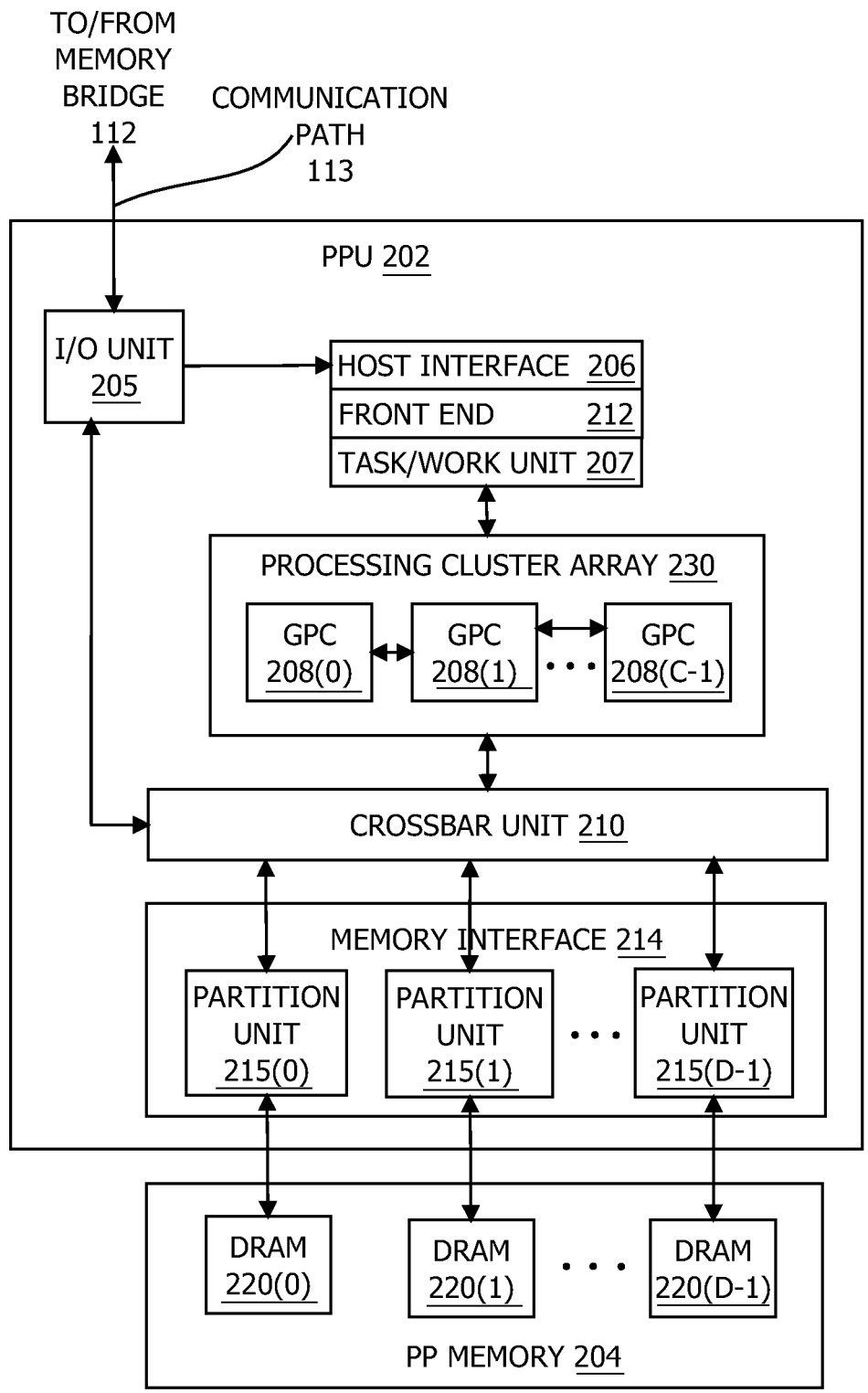
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics processing pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where $D \geq 1$. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Graphics Pipeline Architecture

Figure 3:
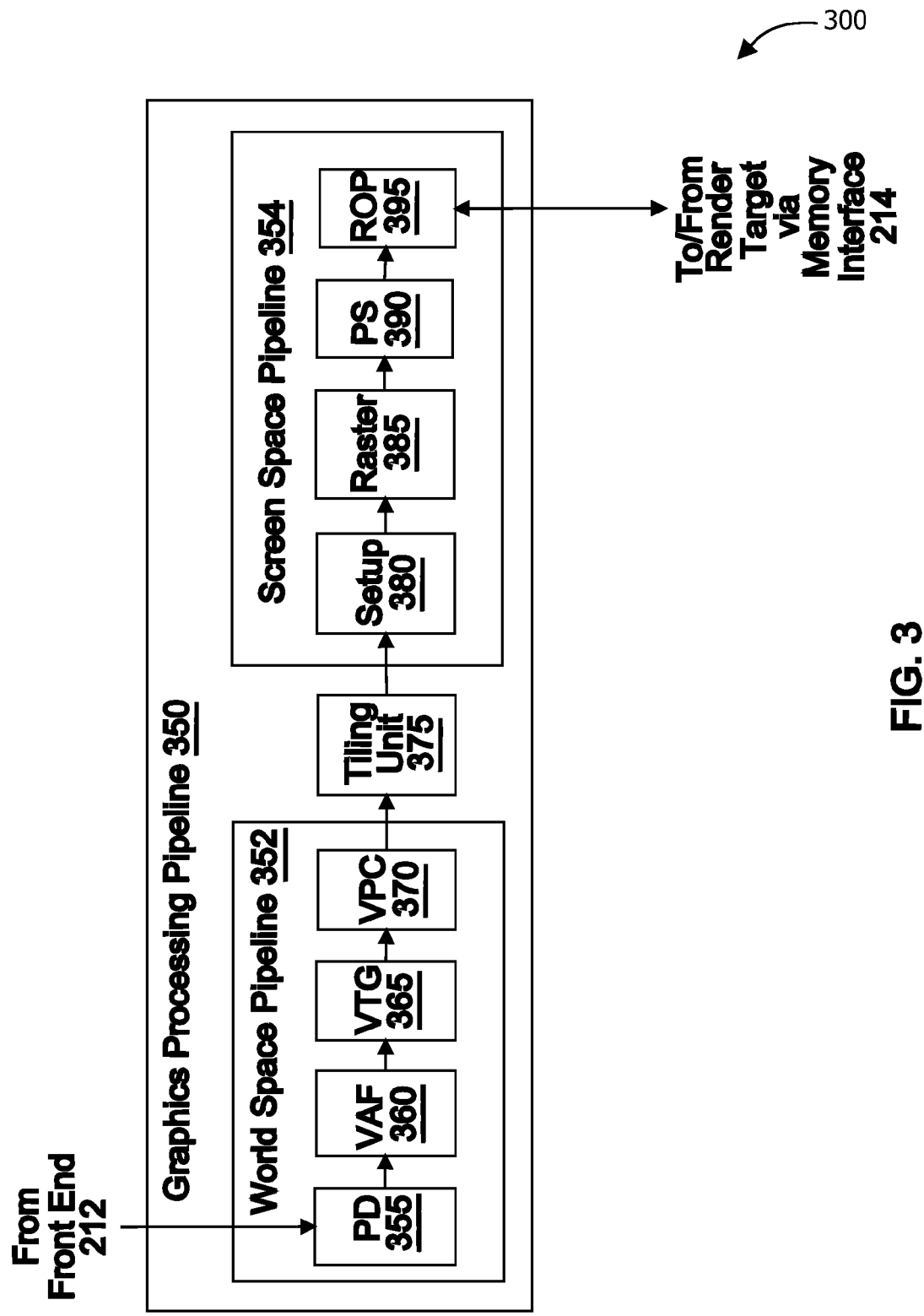
FIG. 3 is a conceptual diagram of a graphics processing pipeline that may be implemented within the parallel processing unit of FIG. 2, according to one embodiment of the present invention.

FIG. 3 is a conceptual diagram of a graphics processing pipeline 350 that may be implemented within the PPU 202 of FIG. 2, according to one embodiment of the present invention. As shown, the graphics processing pipeline 350 includes, without limitation, a primitive distributor (PD) 355; a vertex attribute fetch unit (VAF) 360; a vertex, tessellation, geometry processing unit (VTG) 365; a viewport scale, cull, and clip unit (VPC) 370; a tiling unit 375, a setup unit (setup) 380, a rasterizer (raster) unit 385; a fragment processing unit, also identified as a pixel shading unit (PS) 390, and a raster operations unit (ROP) 395.

The PD 355 collects vertex data associated with high-order surfaces, graphics primitives, and the like, from the front end 212 and transmits the vertex data to the VAF 360.

The VAF 360 retrieves vertex attributes associated with each of the incoming vertices from shared memory and stores the vertex data, along with the associated vertex attributes, into shared memory.

The VTG 365 is a programmable execution unit that is configured to execute vertex shader programs, tessellation programs, and geometry programs. These programs process the vertex data and vertex attributes received from the VAF 360 and produce graphics primitives for further processing within the graphics processing pipeline 350. Although not explicitly shown, the VTG 365 may include, in some embodiments, one or more of a vertex processing unit, a tessellation initialization processing unit, a task generation unit, a task distributor, a topology generation unit, a tessellation processing unit, and a geometry processing unit.

The vertex processing unit is a programmable execution unit that is configured to execute vertex shader programs, lighting and transforming vertex data as specified by the vertex shader programs. For example, the vertex processing unit may be programmed to transform the vertex data from an object-based coordinate representation (object space) to an alternatively based coordinate system such as world space or normalized device coordinates (NDC) space. The vertex processing unit may read vertex data and vertex attributes that is stored in shared memory by the VAF and may process the vertex data and vertex attributes. The vertex processing unit stores processed vertices in shared memory.

The tessellation initialization processing unit is a programmable execution unit that is configured to execute tessellation initialization shader programs. The tessellation initialization processing unit processes vertices produced by the vertex processing unit and generates graphics primitives known as patches. The tessellation initialization processing unit also generates various patch attributes. The tessellation initialization processing unit then stores the patch data and patch attributes in shared memory. In some embodiments, the tessellation initialization shader program may be called a hull shader or a tessellation control shader.

The task generation unit retrieves data and attributes for vertices and patches from shared memory. The task generation unit generates tasks for processing the vertices and patches for processing by later stages in the graphics processing pipeline 350.

The task distributor redistributes the tasks produced by the task generation unit. The tasks produced by the various instances of the vertex shader program and the tessellation initialization program may vary significantly between one graphics processing pipeline 350 and another. The task distributor redistributes these tasks such that each graphics processing pipeline 350 has approximately the same workload during later pipeline stages.

The topology generation unit retrieves tasks distributed by the task distributor. The topology generation unit indexes the vertices, including vertices associated with patches, and computes (U,V) coordinates for tessellation vertices and the indices that connect the tessellated vertices to form graphics primitives. The topology generation unit then stores the indexed vertices in shared memory.

The tessellation processing unit is a programmable execution unit that is configured to execute tessellation shader programs. The tessellation processing unit reads input data from and writes output data to shared memory. This output data in shared memory is passed to the next shader stage, the geometry processing unit as input data. In some embodiments, the tessellation shader program may be called a domain shader or a tessellation evaluation shader.

The geometry processing unit is a programmable execution unit that is configured to execute geometry shader programs, thereby transforming graphics primitives. Vertices are grouped to construct graphics primitives for processing, where graphics primitives include triangles, line segments, points, and the like. For example, the geometry processing unit may be programmed to subdivide the graphics primitives into one or more new graphics primitives and calculate parameters, such as plane equation coefficients, that are used to rasterize the new graphics primitives.

The geometry processing unit transmits the parameters and vertices specifying new graphics primitives to the VPC 370.

The geometry processing unit may read data that is stored in shared memory for use in processing the geometry data. The VPC 370 performs clipping, culling, and viewport transform to determine which graphics primitives are potentially viewable in the final rendered image and which graphics primitives are not potentially viewable. The VPC 370 then transmits processed graphics primitives to the tiling unit 375.

The tiling unit 375 is a graphics primitive sorting engine that resides between a world space pipeline 352 and a screen space pipeline 354, as further described herein. Graphics primitives are processed in the world space pipeline 352 and then transmitted to the tiling unit 375. The screen space is divided into cache tiles, where each cache tile is associated with a portion of the screen space. For each graphics primitive, the tiling unit 375 identifies the set of cache tiles that intersect with the graphics primitive, a process referred to herein as "tiling." After tiling a certain number of graphics primitives, the tiling unit 375 processes the graphics primitives on a cache tile basis, where graphics primitives associated with a particular cache tile are transmitted to the setup unit 380. The tiling unit 375 transmits graphics primitives to the setup unit 380 one cache tile at a time. Graphics primitives that intersect with multiple cache tiles are typically processed once in the world space pipeline 352, but are then transmitted multiple times to the screen space pipeline 354.

Such a technique improves cache memory locality during processing in the screen space pipeline 354, where multiple memory operations associated with a first cache tile access a region of the L2 caches, or any other technically feasible cache memory, that may stay resident during screen space processing of the first cache tile. Once the graphics primitives associated with the first cache tile are processed by the screen space pipeline 354, the portion of the L2 caches associated with the first cache tile may be flushed and the tiling unit may transmit graphics primitives associated with a second cache tile. Multiple memory operations associated with a second cache tile may then access the region of the L2 caches that may stay resident during screen space processing of the second cache tile. Accordingly, the overall memory traffic to the L2 caches and to the render targets may be reduced. In some embodiments, the world space computation is performed once for a given graphics primitive irrespective of the number of cache tiles in screen space that intersects with the graphics primitive.

The setup unit 380 receives vertex data from the VPC 370 via the tiling unit 375 and calculates parameters associated with the graphics primitives, including, without limitation, the color values, surface normal vectors, and transparency values at each vertex of the graphics primitive. The setup unit 380 then transmits processed graphics primitives to rasterizer unit 385.

The rasterizer unit 385 scan converts the new graphics primitives and transmits fragments and coverage data to the pixel shading unit 390. Additionally, the rasterizer unit 385 may be configured to perform z culling and other z-based optimizations.

The pixel shading unit 390 is a programmable execution unit that is configured to execute fragment shader programs, transforming fragments received from the rasterizer unit 385, as specified by the fragment shader programs. Fragment shader programs may shade fragments at pixel-level granularity, where such shader programs may be called pixel shader programs. Alternatively, fragment shader programs may shade fragments at sample-level granularity, where each pixel includes multiple samples, and each sample represents a portion of a pixel. Alternatively, fragment shader programs may shade fragments at any other technically feasible granularity, depending on the programmed sampling rate.

In various embodiments, the fragment processing unit 460 may be programmed to perform operations such as perspective correction, texture mapping, shading, blending, and the like, to produce shaded fragments that are transmitted to the ROP unit 395. The pixel shading unit 390 may read data that is stored in shared memory.

The ROP unit 395 is a processing unit that performs raster operations, such as stencil, z test, blending, and the like, and transmits pixel data as processed graphics data for storage in graphics memory via the memory interface 214, where graphics memory is typically structured as one or more render targets. The processed graphics data may be stored in graphics memory, parallel processing memory 204, or system memory 104 for display on display device 110 or for further processing by CPU 102 or parallel processing subsystem 112. In some embodiments, the ROP unit 395 is configured to compress z or color data that is written to memory and decompress z or color data that is read from memory. In various embodiments, the ROP unit 395 may be located in the memory interface 214, in the GPCs 208, in the processing cluster array 230 outside of the GPCs, or in a separate unit (not shown) within the PPUs 202.

The graphics processing pipeline 350 may be implemented by any one or more processing elements within PPU 202. For example, a streaming multiprocessor (not shown) within one of the GPCs 208 of FIG. 2 could be configured to perform the functions of one or more of the VTG 365 and the pixel shading unit 390. The functions of the PD 355, the VAF 360, the VPC 450, the tiling unit 375, the setup unit 380, the rasterizer unit 385, and the ROP unit 395 may also be performed by processing elements within a particular GPC 208 in conjunction with a corresponding partition unit 215. Alternatively, graphics processing pipeline 350 may be implemented using dedicated fixed-function processing elements for one or more of the functions listed above. In various embodiments, PPU 202 may be configured to implement one or more graphics processing pipelines 350.

In some embodiments, the graphics processing pipeline 350 may be divided into a world space pipeline 352 and a screen space pipeline 354. The world space pipeline 352 processes graphics objects in 3D space, where the position of each graphics object is known relative to other graphics objects and relative to a 3D coordinate system. The screen space pipeline 354 processes graphics objects that have been projected from the 3D coordinate system onto a 2D planar surface representing the surface of the display device 110. For example, the world space pipeline 352 could include pipeline stages in the graphics processing pipeline 350 from the PD 355 through the VPC 370. The screen space pipeline 354 could include pipeline stages in the graphics processing pipeline 350 from the setup unit 380 through the ROP unit 395. The tiling unit 375 would follow the last stage of the world space pipeline 352, namely, the VPC 370. The tiling unit 375 would precede the first stage of the screen space pipeline 354, namely, the setup unit 380.

In some embodiments, the world space pipeline 352 may be further divided into an alpha phase pipeline and a beta phase pipeline. For example, the alpha phase pipeline could include pipeline stages in the graphics processing pipeline 350 from the PD 355 through the task generation unit. The beta phase pipeline could include pipeline stages in the graphics processing pipeline 350 from the topology generation unit through the VPC 370. The graphics processing pipeline 350 performs a first set of operations during processing in the alpha phase pipeline and a second set of operations during processing in the beta phase pipeline. As used herein, a set of operations is defined as one or more instructions executed by a single thread, by a thread group, or by multiple thread groups acting in unison.

In a system with multiple graphics processing pipeline 350, the vertex data and vertex attributes associated with a set of graphics objects may be divided so that each graphics processing pipeline 350 has approximately the same amount of workload through the alpha phase. Alpha phase processing may significantly expand the amount of vertex data and vertex attributes, such that the amount of vertex data and vertex attributes produced by the task generation unit is significantly larger than the amount of vertex data and vertex attributes processed by the PD 355 and VAF 360. Further, the task generation unit associated with one graphics processing pipeline 350 may produce a significantly greater quantity of vertex data and vertex attributes than the task generation unit associated with another graphics processing pipeline 350, even in cases where the two graphics processing pipelines 350 process the same quantity of attributes at the beginning of the alpha phase pipeline. In such cases, the task distributor redistributes the attributes produced by the alpha phase pipeline such that each graphics processing pipeline 350 has approximately the same workload at the beginning of the beta phase pipeline.

Please note, as used herein, references to shared memory may include any one or more technically feasible memories, including, without limitation, a local memory shared by one or more streaming multiprocessors, or a memory accessible via the memory interface 214, such as a cache memory, parallel processing memory 204, or system memory 104. Please also note, as used herein, references to cache memory may include any one or more technically feasible memories, including, without limitation, an L1 cache, an L1.5 cache, and the L2 caches.

Path Rendering

The software application 125 of FIG. 1 may configure the graphics processing pipeline 350 to perform various operations related to generating pixel data based on graphics data supplied by CPU 102 and/or system memory 104. In particular, the software application 125 may configure the graphics processing pipeline 350 to perform operations related to path rendering. As outlined previously herein, path rendering is the basis for a number of important rendering standards, such as HTML 5 Canvas and SVG. In operation, the PPU 202 implements stencil-then-cover path rendering with N coverage samples per pixel and M color samples per pixel, where N is greater than M. In general, the software application 125 defines a path and configures the PPU 202 to perform stencil-the-cover path rendering as two sequential rendering passes—the path stenciling pass and the path covering pass.

Figure 4:
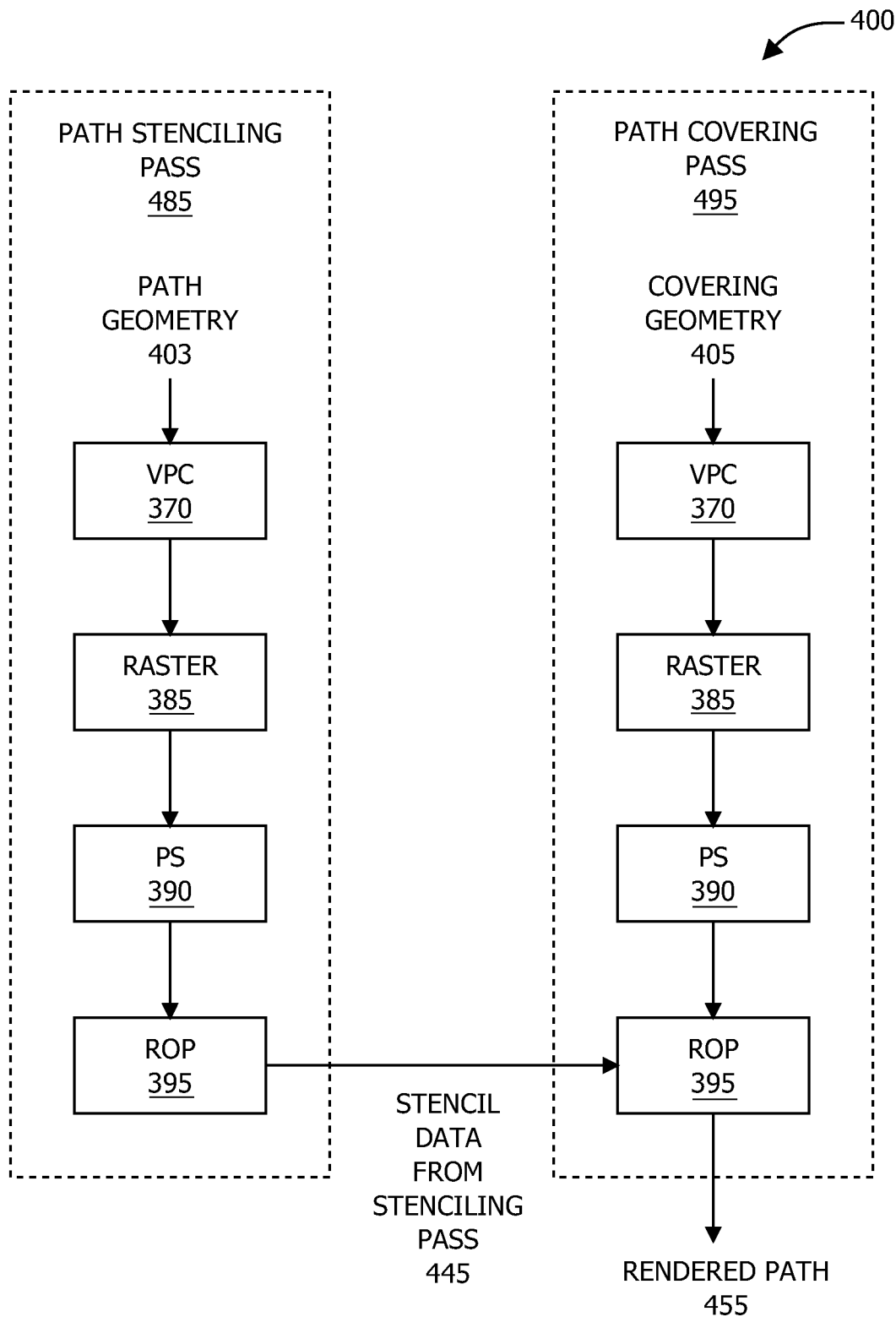
FIG. 4 is a conceptual diagram illustrating a path stenciling pass and a path covering pass that the parallel processing unit of FIG. 2 may be configured to implement, according to one embodiment of the present invention.

FIG. 4 is a conceptual diagram illustrating a path stenciling pass 485 and a path covering pass 495 that the PPU 202 of FIG. 2 may be configured to implement, according to one embodiment of the present invention. As previously disclosed herein, the PPU 202 is configured to perform stencil-then-cover path rendering. First, the PPU 202 performs the path stenciling pass 485, thereby generating a stencil data from stenciling pass 445. Subsequently, the PPU 202 initiates the path covering pass 495, thereby generating a rendered path 455.

In operation, the software application 125 of FIG. 1 specifies a path and initiates the path stenciling pass 485. Upon receiving the path specification, the PPU 202 generates a path geometry 403 that represents the path. As shown, the VPC unit 370, the rasterizer unit 385, the PS unit 390, and the ROP unit 395 process the path geometry 403, rendering the stencil data from stenciling pass 445 to a stencil buffer. In alternate embodiments, the PPU may process the path geometry in any technically feasible fashion using any available processing units in any combination. The values in the stencil buffer indicate which coverage samples are covered by the path. As previously disclosed herein, the PPU 202 maintains N coverage sample per pixel and M color samples per pixel, where N is greater than M. During the path stenciling pass 485, the coverage samples are updated, but the color samples are not updated.

After generating the stencil data from stenciling pass 445, the PPU 202 generates a covering geometry 405 that conservatively covers the path. As shown, the VPC unit 370, the rasterizer unit 385, the PS unit 390, and the ROP unit 395 process the covering geometry 405, shading the covered pixels and generating the rendered path 455. In alternate embodiments, the PPU may process the covering geometry in any technically feasible fashion using any available processing units in any combination. During this process, the PPU 202 reduces the number of coverage samples to the number of color samples. In some implementations, for each color sample, the PPU 202 identifies a group of N/M coverage samples that are associated with the color sample and generates an opacity value for the color sample based on the proportion of the N/M coverage samples that are covered. For instance, if the number of coverage samples per pixel is 16 and the number of color samples per pixel is 4, then the PPU 202 associates groups of 4 coverage samples with each color sample, and the possible opacity values are 0, 0.25, 0.5, 0.75, and 1.0. Notably, the PPU 202 uses the stencil data from stenciling pass 455 included in the stencil buffer to discard any fragments and coverage samples that are not covered by the path. The PPU 202 then writes the surviving fragments to the color buffer as the rendered path 455.

As previously disclosed herein, typical prior-art PPUs may determine that a color sample is only partially covered by a graphics primitive at a shared edge. Consequently, such PPUs could introduce conflation artifacts at the shared edge. By contrast, the PPU 202 determines that each color sample is either fully covered or uncovered by a graphics primitive at each shared edge. However, the PPU 202 may determine that a particular color sample is only partially covered by a graphics primitive at an unshared edge. Consequently, the techniques disclosed herein enable the PPU 202 to effectively render paths using more coverage samples than color samples, while ensuring that the rendered paths do not include conflation artifacts associated with shared edges.

Figure 5:
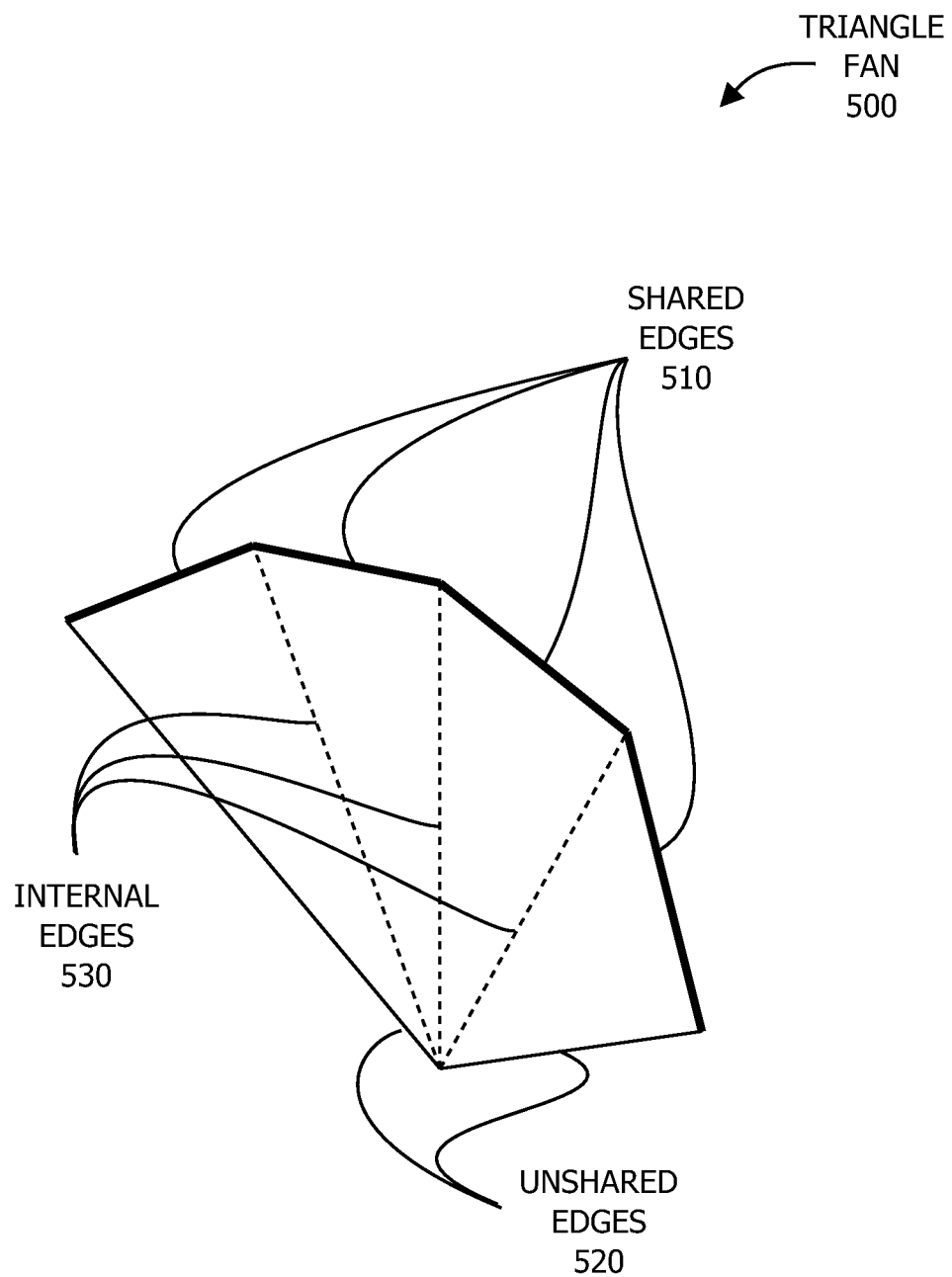
FIG. 5 is a conceptual diagram illustrating a triangle fan that the graphics processing pipeline of FIG. 3 may be configured to render, according to one embodiment of the present invention.

FIG. 5 is a conceptual diagram illustrating a triangle fan 500 that the graphics processing pipeline 350 of FIG. 3 may be configured to render, according to one embodiment of the present invention. As previously disclosed herein, the PPU 202 is configured to render the path geometry 403 and the covering geometry 405 as part of stencil-then-cover path rendering. The triangle fan 500 may be included in either or both of the path geometry 403 and the covering geometry 405.

As shown, the triangle fan 500 is a set of connected triangles that share a single vertex. As also shown, the triangle fan 500 includes shared edges 510, unshared edges 520, and internal edges 530. In particular, each of the shared edges 510 is also included in another path (not shown.) For instance, each of the shared edges 510 may also be included in a different graphics primitive. By contrast, the unshared edges 520 and the internal edges 530 are not included in any other paths. The shared edges 510 may be identified in any technically feasible fashion. For instance, the software application 125 of FIG. 1 may explicitly identify the shared edges 510 as part of the path specification. In addition, the device driver 103 of FIG. 1 may designate shared edges 510 as part of processing the path specification.

As shown, the internal edges 530 are edges that are internal to the triangle fan 500. Each of the internal edges 530 is shared between connected triangles included in the triangle fan 500. The internal edges 530 may be identified in any technically feasible fashion. For instance, the internal edges 530 may be identified based on the specification of the triangle fan 500.

In one embodiment, during the path stenciling pass 485, the PPU 202 determines coverage relative to the shared edges 510 differently than coverage relative to the unshared edges 520 and the internal edges 530. Subsequently, during the path covering pass 495, the PPU 202 determines coverage relative to the internal edges 530 differently than coverage relative to the shared edges 510 and the unshared edges 520. In alternative embodiments, the PPU may be configured to identify any number of other edge characteristics and, subsequently, modify the rendering process based on these edge characteristics. For instance, in some alternate embodiments, during the path covering pass, the PPU does not distinguish between shared edges, unshared edges, and internal edges when determining coverage.

As persons skilled in the art will recognize, the triangle fan 500 is an example of a particular graphics primitive that the graphics processing pipeline 350 may be configured to render. Other graphics primitives, such as triangle strips, may also include shared edges 510, unshared edges 520, and internal edges 530. Such graphics primitives are processed by the PPU 202 in a similar fashion.

Figure 6:
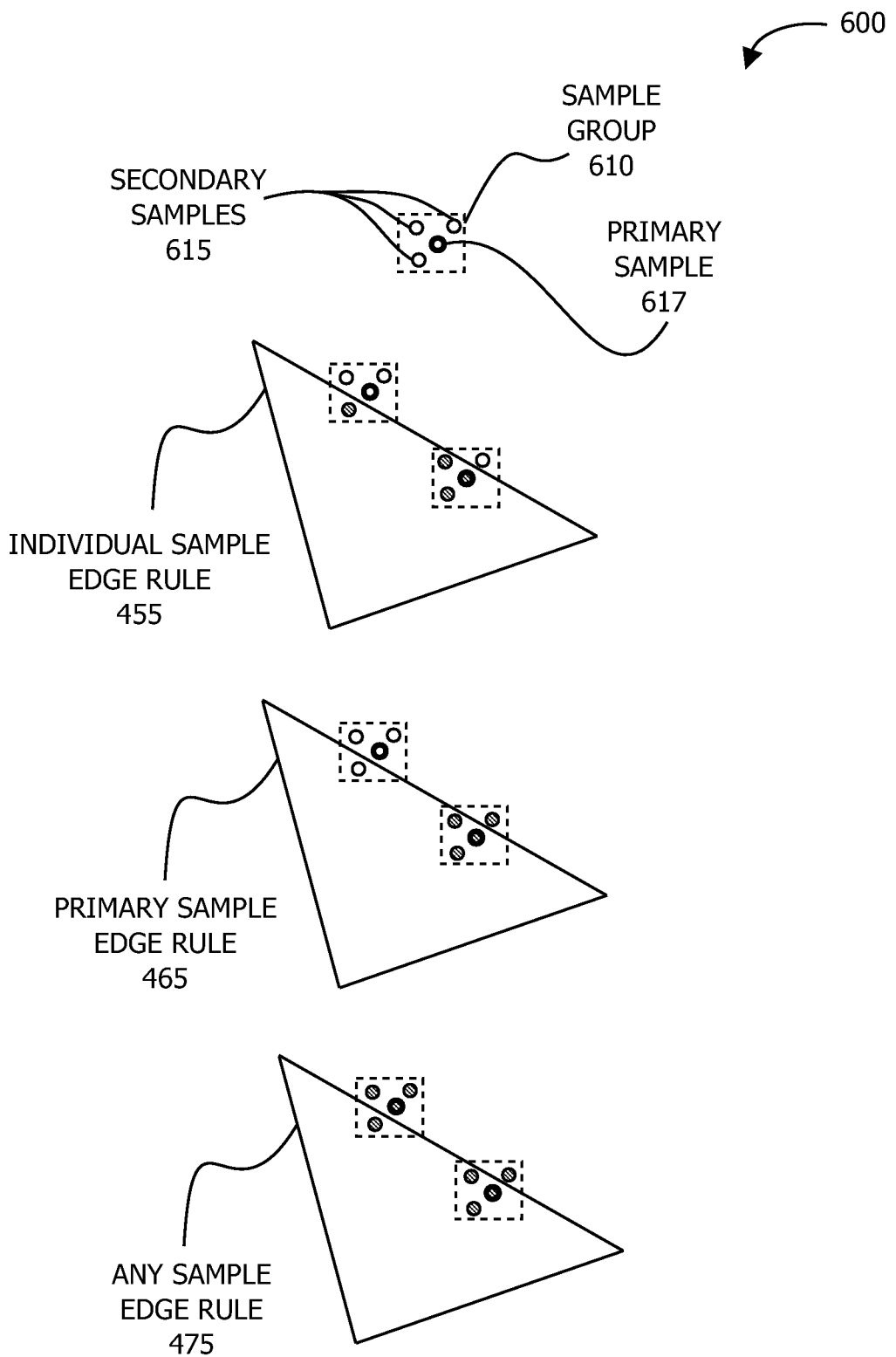
FIG. 6 is a conceptual diagram illustrating a sample group and sample edge rules that the rasterizer unit of FIG. 3 may be configure to implement, according to one embodiment of the present invention.

FIG. 6 is a conceptual diagram illustrating a sample group 610 and sample edge rules that the rasterizer unit 385 of FIG. 3 may be configure to implement, according to one embodiment of the present invention. As previously disclosed herein, the PPU 202 supports N coverage samples per pixel and M color samples per pixel, where N is greater than M. As shown, for each color sample, the PPU 202 identifies the sample group 610 of N/M coverage samples that are associated with the color sample. Further, the PPU 202 designates one of the coverage samples included in the sample group 610 as a primary sample 617, and the remainder of the coverage samples included in the sample group 610 as secondary samples 615.

As shown, FIG. 6 depicts the sample group 610 as a dotted square, the primary sample 617 as a heavily outlined dot, and the secondary samples 615 as lightly outlined dots. Further, FIG. 6 depicts covered samples as filled and uncovered samples as unfilled. As also shown, each of the sample groups 610 includes a single primary sample 617 and three secondary samples 615. The computer system 100 may determine the position of the coverage samples and designate the primary coverage sample 617 in any technically feasible fashion. For instance, the device driver 103 may determine the positions of the coverage samples and designate the first coverage sample included in each sample group 610 as the primary coverage sample 617. However, for each sample group 610, the computer system 100 selects the corresponding primary sample 617 deterministically and consistently across paths. In alternate embodiments, the sample group may include any number, including zero, of secondary samples.

Advantageously, in one embodiment, the rasterizer unit 385 is configured to select between different sample edge rules based on characteristics associated with each edge. Note that sample edge rules, also referred to herein as "sample rules," are rasterization rules that may be applied to a coverage sample to determine whether the coverage sample is considered to be inside an edge. For each edge, the rasterizer unit 385 applies the selected sample edge rule to the edge to determine the coverage of the coverage samples included in the sample group 610. The sample edge rules include, without limitation, an individual sample edge rule 455, a primary sample edge rule 465, and an any sample edge rule 475. As in conventional rasterizing operations, the rasterizer unit 385 determines the coverage of the sample group 610 relative to a particular primitive by determining the intersection or union of the coverage results related to each edge of the primitive.

In applying the individual sample edge rule 455, the rasterizer unit 385 determines the coverage of each of the coverage samples included in the sample group 610 independently of the other coverage samples included in the sample group 610. In particular, the rasterizer unit 385 determines the coverage of the primary sample 617 based on the position of the primary sample 617 relative to the edge. Similarly, for each of the secondary samples 615, the rasterizer unit 385 determines the coverage of the secondary sample 615 based on the position of the secondary sample 615 relative to the edge.

As shown, the rasterizer unit 385 applies the individual sample edge rule 455 to two sample groups 610 located on one edge of a triangle. For the left-hand sample group 610, the rasterizer unit 385 determines that the position of one of the secondary samples 615 is inside the edge of the triangle and is, consequently, covered. For the right-hand sample group 610, the rasterizer unit 385 determines that the positions of the primary sample 617 and two of the three secondary samples 615 are located inside the edge of the triangle and are, consequently, covered.

In applying the primary sample edge rule 465, the rasterizer unit 385 determines the coverage of all of the coverage samples included in the sample group 610 based on the position of the primary sample 617 relative to the edge. Consequently, the rasterizer unit 385 determines that either all of the coverage samples included in the sample group 610 are covered or all of the coverage samples included in the sample group 610 are uncovered. Advantageously, determining coverage in this manner ensures that, for the color sample associated with the sample group 610, coverage is not conflated with opacity during the reduction from (N/M) coverage samples to a single color sample.

As shown, the rasterizer unit 385 applies the primary sample edge rule 465 to two sample groups 610 located on one edge of a triangle. For the left-hand sample group 610, the rasterizer unit 385 determines that the position of the primary sample 617 is outside the edge of the triangle and, consequently, the primary sample 617 and all of the secondary samples 615 are uncovered. For the right-hand sample group 610, the rasterizer unit 385 determines that the position of the primary sample 617 is inside the edge of the triangle and, consequently, the primary sample 617 and all of the secondary samples 615 are covered.

In applying the any sample edge rule 475, if the rasterizer unit 385 determines that the position of the primary sample 617 or any of the secondary samples 615 is inside the primitive relative to the edge, then the rasterizer unit 385 determines that all of the coverage samples are covered. Determining coverage in this manner ensures that, for the color sample associated with the sample group 610, coverage is not conflated with opacity during the reduction from (N/M) coverage samples to a single color sample. Notably, the any sample edge rule 475 is more conservative than the individual sample edge rule 455 and the primary sample edge rule 465.

As shown, the rasterizer unit 385 applies the any sample edge rule 465 to two sample groups 610 located on one edge of a triangle. For the left-hand sample group 610, the rasterizer unit 385 determines that the position of one of the four coverage samples is inside the edge of the triangle and, consequently, the primary sample 617 and all of the secondary samples 615 are covered. For the right-hand sample group 610, the rasterizer unit 385 determines that the positions of three of the four coverage samples are inside the edge of the triangle and, consequently, the primary sample 617 and all of the secondary samples 615 are covered.

Again, the rasterizer unit 385 may be configured to apply different sample edge rules to the edges of a primitive based on characteristics of the edge. Further, the rasterizer unit 385 may be configured to select different edge rules based on whether the PPU 202 is executing the path stenciling pass 485 or the path covering pass 495. Although the examples described in conjunction with FIG. 6 illustrate coverage relative to a single edge, the rasterizer unit 385 determines the coverage of the sample group 610 relative to a particular primitive by determining the intersection of the coverage results related to each edge of the primitive.

In one embodiment, during the path stenciling pass 485, the rasterizer unit 385 applies the individual sample edge rule 455 to the unshared edges 520 and the internal edges 530. By contrast, the rasterizer unit 385 applies the primary sample edge rule 465 to the shared edges 510. Since the rasterizer unit 385 determines that each sample group 610 is either fully covered or fully uncovered relative to the shared edges 510, conflation artifacts associated with shared edges in prior-art techniques may be reduced.

During the path covering pass 495, the rasterizer unit 385 applies the any sample edge rule 475 to the unshared edges 520 and the shared edges 510, and applies the primary sample edge rule 465 to the internal edges 530. Again, because the rasterizer unit 385 determines that each sample group 610 is either fully covered or fully uncovered relative to the shared edges 510, conflation artifacts associated with shared edges in prior-art techniques may be reduced. Further, by applying the primary sample edge rule 465 to the internal edges 530, the rasterizer unit 385 avoids double rasterization during the path covering pass 495.

In some embodiments of the present invention, the computer system 100 may configure the PPU 202 to effectively apply the primary sample edge rule 465 on a per-path basis. In particular, if the computer system 100 determines that any of the edges included in a path are shared edges 510, then the computer system 100 configures the PPU 202 to determine the coverage of the entire sample group 610 based on the position of the primary sample 617.

In one embodiment, if the device driver 103 of FIG. 1 determines that a path includes shared edges 510, then the device driver 103 co-locates the positions of the coverage samples included in each of the sample groups 610 when rasterizing the path. More specifically, before the rasterizer unit 385 rasterizes a primitive associated with such a path, the device driver 103 reprograms the positions of all of the secondary samples 615 to match the position of the associated primary sample 617. Consequently, for each sample group 610, the rasterizer unit 385 associates a single position with all of the coverage samples. After the rasterizer unit 385 rasterizes the primitive, the device driver 103 restores the positions of the secondary samples 615 to the originally assigned positions. As persons skilled in the art will recognize, operations involving co-locating and restoring the positions of the secondary samples 615 may be reduced when the PPU 202 processes a sequence of primitives that all include shared edges 510.

In another embodiment, if the computer system 100 determines that a path includes shared edges 510, the computer system 100 configures the PS unit 390 to assign a single output coverage to all of the samples included in the sample group 510 via a sample mask. In operation, the PS unit 390 selects the output coverage of the primary sample 617, assigns the selected coverage to each of the associated secondary samples 615, and writes the corresponding sample mask.

Figure 7:
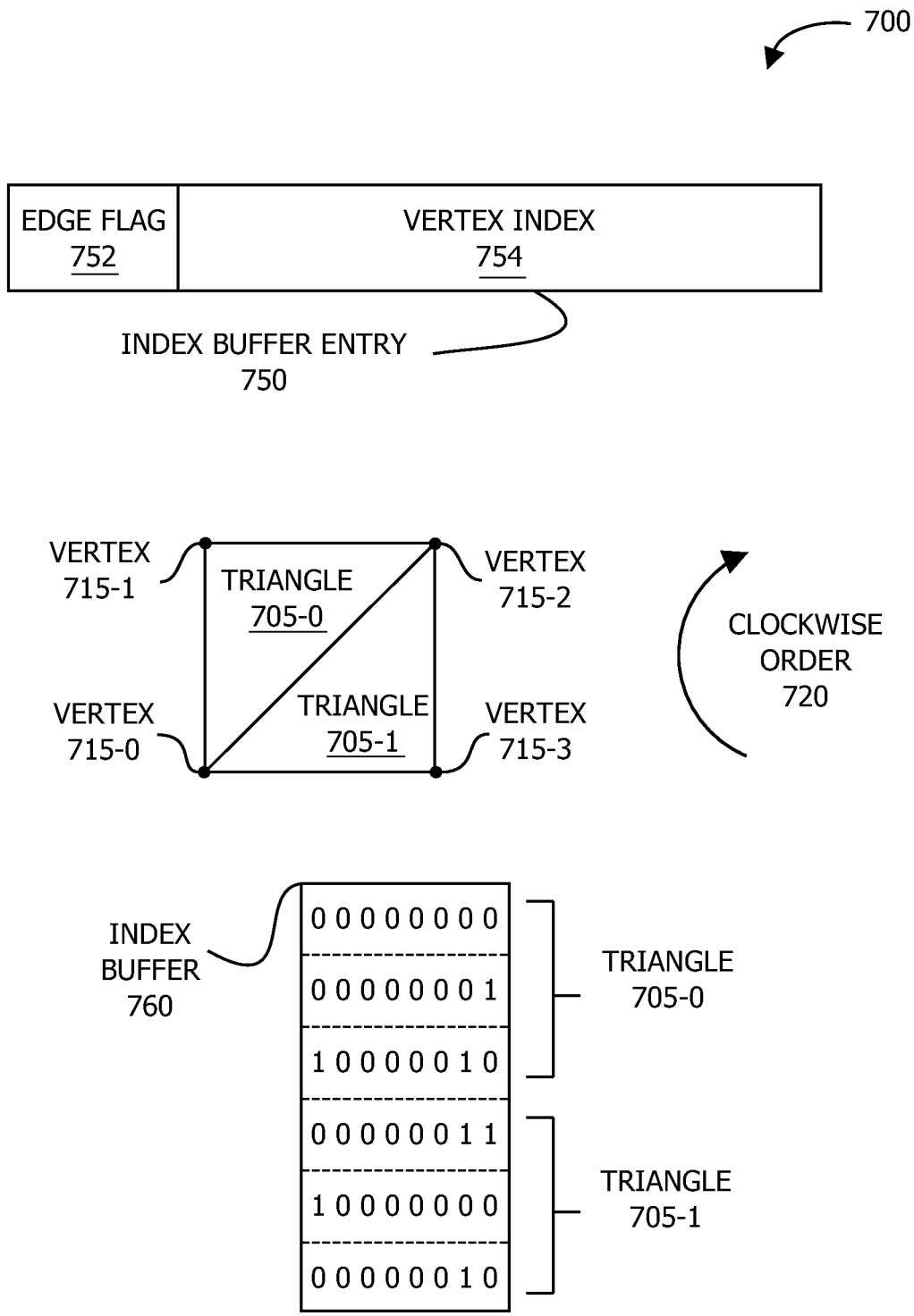
FIG. 7 is a conceptual diagram illustrating an index buffer, according to one embodiment of the present invention.

FIG. 7 is a conceptual diagram illustrating an index buffer 760, according to one embodiment of the present invention. As is well known in the art, the index buffer 760 may be used to reduce the memory used to store graphics primitives as part of indexed geometry rendering.

In operation, a graphics primitive may be represented by a sequence of index buffer entries 750 included in the index buffer 760. As shown, each index buffer entry 750 includes an edge flag 752 and a vertex index 754. In general, each index buffer entry 750 includes N total bits of which the most significant M bits store the edge flag 752 and the remaining (N−M) bits store the vertex buffer index 754. As in conventional indexed geometry rendering, the vertex index 754 is an index into a vertex buffer (not shown) that includes per-vertex data. However, in prior-art approaches, typically all N bits included in each index buffer entry are allocated for storage of the vertex index. Advantageously, by repurposing the most significant bits of each index buffer entry 750 to represent the edge flag 752, each index buffer entry 750 may store per-edge data in addition to the per-vertex data accessed via the vertex index 754. By contrast, conventional techniques typically duplicate the vertex data for each edge.

For example, as shown, the triangle 705-0 may be defined in a clockwise order 720 by the three vertices 715-0, 715-1, and 715-2. As also shown, the triangle 705-1 may be defined in the clockwise order 720 by the three vertices 715-3, 715-0, and 715-2. Further, the edge that connects the vertex 715-0 and the vertex 715-2 is shared between multiple paths. As shown, the index buffer 760 represents the two triangles 705-0 and 705-1 using 8-bit index buffer entries 750, where the most significant bit stores the edge flag 752 and the remaining 7 bits store the vertex index 754. In particular, an edge flag 752 value of '1' indicates that the graphics primitive edge originating from the corresponding vertex index 754 is one of the shared edges 510.

To further optimize memory use, the semantics of the edge flag 752 may vary depending on the rendering pass. In the example index buffer 760, the PPU 202 is configured to implement the path stenciling pass 485, and an activated edge flag 752 indicates the origin vertex 715 of a particular shared edge 510. By contrast, if the PPU 202 is configured to implement the path covering pass 495, then an activated edge flag 752 indicates the origin vertex 715 of a particular internal edge 530.

In alternate embodiments, any number of bits may be reserved for the edge flag, and the edge flag may represent any data associated with edges. In some embodiments, the rasterizer unit may be configured to select between two sample edge rules based on the edge flag. In other embodiments, the edge flag may represent several different characteristics of the edge, such as shared versus unshared and internal versus external. As persons skilled in the art will understand, embodiments of the invention include any techniques that repurpose bits included in the index buffer to guide the selection of sample edge rules during rasterizing operations.

Figure 8A:
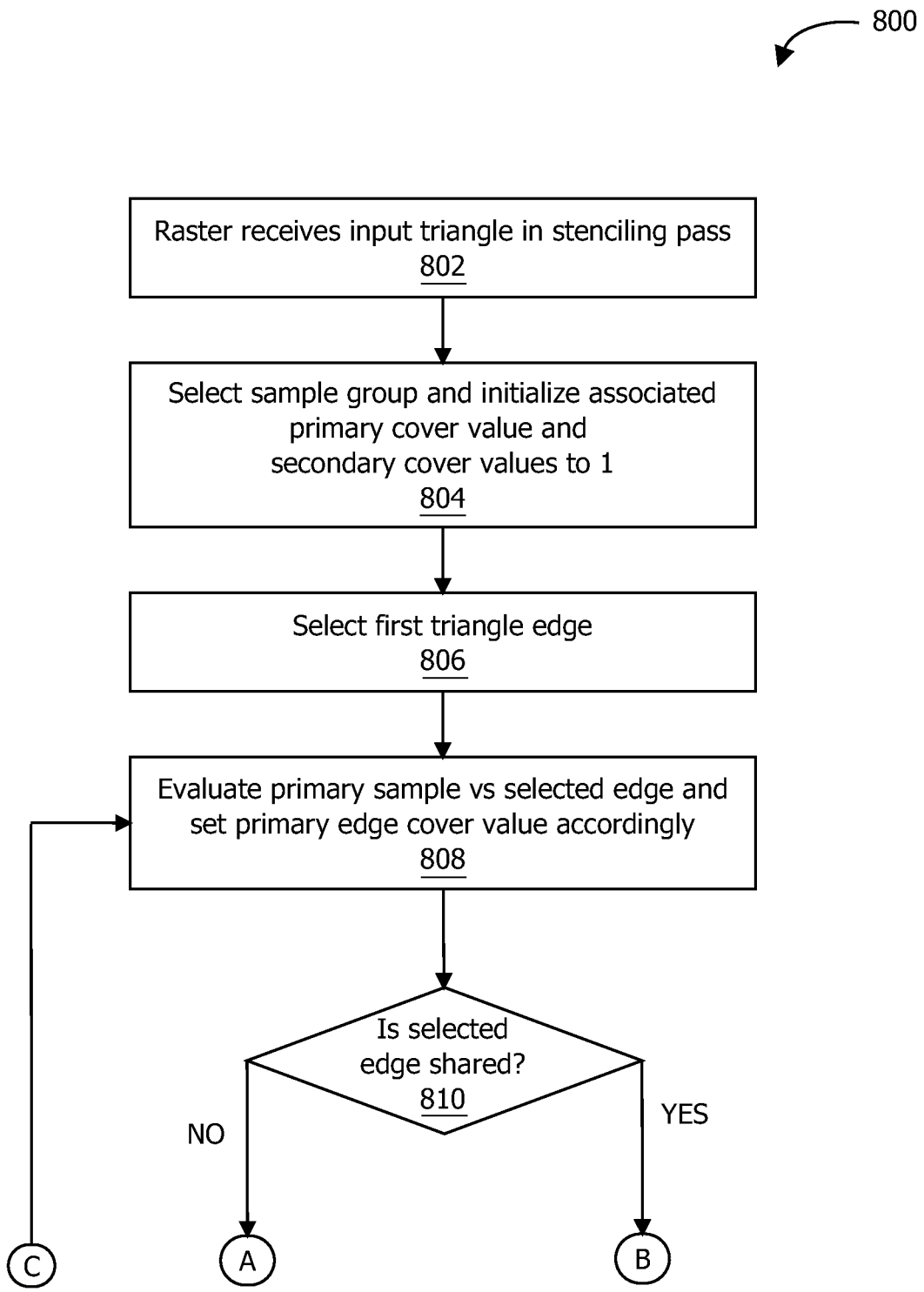
FIGS. 8A-8B set forth a flow diagram of method steps for rasterizing triangles, according to one embodiment of the present invention.
Figure 8B:
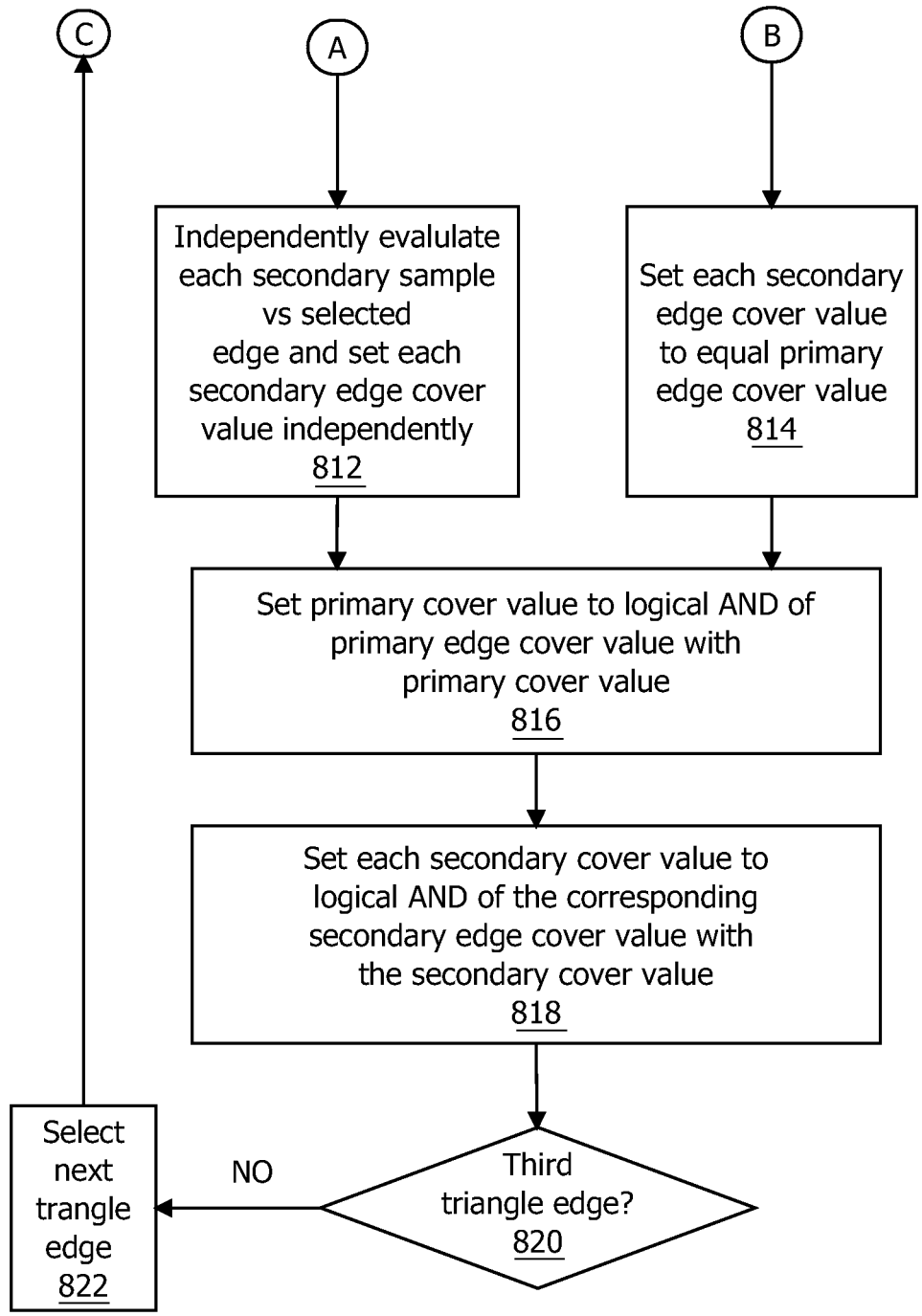

FIGS. 8A-8B set forth a flow diagram of method steps for rasterizing triangles, according to one embodiment of the present invention. Although the method steps are described with reference to the systems of FIGS. 1-7, persons skilled in the art will understand that any system configured to implement the method steps, in any order, falls within the scope of the present invention.

As shown, a method 800 begins at step 802, where the rasterizer unit 385 receives an input triangle as part of the path stenciling pass 485. At step 804, the rasterizer unit 385 selects a particular sample group 610 of coverage samples, and initializes an associated primary cover value and associated secondary cover values to values of '1.' The primary cover value and each of the secondary cover values represent whether the associated coverage sample is considered to be covered by the input triangle. As disclosed previously herein, the PPU 202 maintains N coverage samples per pixel and M color samples per pixel, where N is greater than M. Each sample group 610 is associated with a particular color sample. Further, one of the (N/M) coverage samples in the sample group 610 is the primary sample 617 and the remaining coverage samples are the secondary samples 615. The computer system 100 may select the primary sample 617 in any technically feasible fashion. However, for each color sample, the computer system selects the corresponding primary sample 617 deterministically and consistently across paths. Notably, the number of secondary cover values is equal to the number of secondary samples 615.

At step 806, the rasterizer unit 385 selects a first edge included in the input triangle. At step 808, the rasterizer unit 385 evaluates the primary sample 617 versus the selected edge. If the rasterizer unit 385 determines that the position of the primary sample 617 is inside the input triangle with respect to the selected edge, then the rasterizer unit 385 sets a primary edge cover value to '1.' Conversely, if the rasterizer unit 385 determines that the position of the primary sample 617 is outside the input triangle with respect to the selected edge, then the rasterizer unit 385 sets the primary edge cover value to '0.' In general, the primary edge cover value represents whether the primary sample 617 is considered to be inside the selected edge of the input triangle. At step 810, if the rasterizer unit 385 determines that the selected edge is not one of the shared edges 510, then the method 800 proceeds to step 812. The rasterizer unit 385 may determine whether the selected edge is one of the shared edges 510 in any technically feasible fashion. For instance, in some embodiments, the rasterizer unit 385 may perform a read operation on the edge flag 752 to determine whether the edge flag 752 is activated. At step 812, the rasterizer unit 385 applies the individual sample edge rule 455 to the selected edge. In operation, for each of the secondary samples 615, the rasterizer unit 385 sets the corresponding secondary edge cover value based on whether the position of the secondary sample 615 is inside the input triangle with respect to the selected edge. In general, the secondary edge cover value represents whether the secondary sample 615 is considered to be inside the selected edge of the input triangle. The method 800 then proceeds to step 816.

If, at step 810, the rasterizer unit 385 determines that the selected edge is one of the shared edges 510, then the method 800 proceeds to step 814. At step 814, the rasterizer unit 385 applies the primary sample edge rule 465 to the selected edge. In operation, for each of the secondary samples 615, the rasterizer unit 385 sets the corresponding secondary edge cover value to match the primary edge cover value. Advantageously, by determining that the sample group 610 is either fully covered or fully uncovered by the input triangle, the rasterizer unit 385 implements a Boolean concept of coverage for color samples that are associated with shared edges 510.

At step 816, the rasterizer unit 385 performs a logical AND operation between the primary edge cover value and the primary cover value. In this manner, the rasterizing unit 385 composites the coverage of the selected edge with any previous per-edge coverage values. At step 818, for each secondary edge cover value, the rasterizer unit 385 performs a logical AND operation between the secondary edge cover value and the secondary cover value. At step 820, if the rasterizer unit 385 determines that the selected edge is not the third edge included in the input triangle, then the rasterizer unit 385 proceeds to step 822.

At step 822, the rasterizing unit 285 selects the next edge included in the input triangle, and the method 800 returns to step 808. The rasterizer unit 385 cycles through steps 808 through 822, selecting and applying edge rules to each edge until the rasterizer unit 385 has processed all three edges included in the input triangle. In alternate embodiments, the input triangle may be replaced by any input primitive, and the rasterizer unit 385 cycles through steps 808 through 822 until the rasterizer unit 385 has processed all of the edges included in the input primitive. At step 820, if the selected edge is the third edge included in the input triangle, then the primary cover value and the secondary cover value represent the coverage of the sample group 610 by the input triangle. In alternate embodiments, the rasterizer unit 385 may process multiple sample groups or edges in parallel. In some alternate embodiments, the rasterizer unit 385 may select any rasterization rule based on any technically feasible criterion, such as other flags included in the index buffer entry 750.

Figure 9:
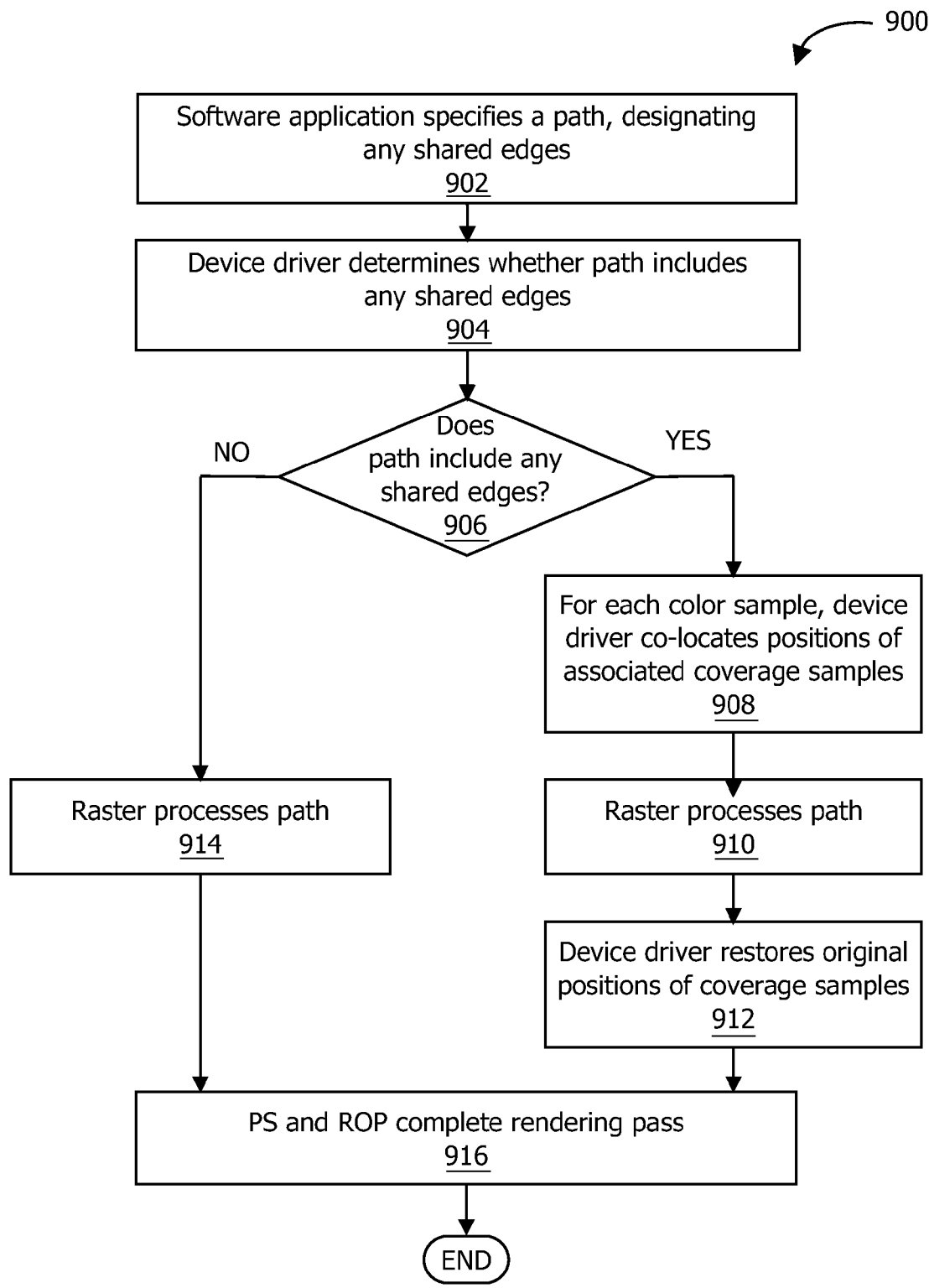
FIG. 9 is a flow diagram of method steps for rendering paths, according to one embodiment of the present invention.

FIG. 9 is a flow diagram of method steps for rendering paths, according to one embodiment of the present invention. Although the method steps are described with reference to the systems of FIGS. 1-7, persons skilled in the art will understand that any system configured to implement the method steps, in any order, falls within the scope of the present invention.

As shown, a method 900 begins at step 902, where the software application 125 specifies a path. As part of defining the path, the software application 125 designates any shared edges 510. At step 904, the device driver 103 determines whether the path includes any shared edges 510. The device driver 103 may identify shared edges 510 included in the path in any technically feasible fashion. For instance, the device driver 103 may identify some shared edges 510 based on explicit commands issued by the software application 125, and identify other shared edges 510 while generating path geometries.

At step 906, if the device driver 103 determines that the path includes one or more shared edges 510, then the method 900 proceeds to step 908. At step 908, for each color sample, the device driver 103 co-locates the coverage samples included in the associated sample group 610. More specifically, for each sample group 610, the device driver 103 sets the positions of all of the secondary samples 615 to match the position of the primary sample 617. In alternate embodiments, the device driver may reprogram the position of the coverage samples in any technically feasible fashion. At step 910, the rasterizer unit 385 processes the path. Advantageously, because each sample group 610 is associated with a single position, the rasterizer unit 285 determines that each color sample is either fully covered or fully uncovered by each graphics primitive. At step 912, the device driver 103 restores the positions of the secondary samples 615 included in each sample group 610, and the method 900 proceeds to step 916. At step 916, the PS unit 390 and the ROP unit 395 complete the rendering pass, and the method 900 terminates. In alternate embodiments, the PS unit 390 and the ROP unit 395 perform step 916, completing the rendering pass, before the device driver 103 performs step 912, restoring the positions of the secondary samples 615.

If, at step 906, the device driver 103 determines that the path does not include one or more shared edges 510, then the method 900 proceeds to step 914. At step 914, the rasterizer unit 385 processes the path. In particular, the rasterizer unit 385 maintains N distinctly located coverage sample per pixel and M color samples per pixel while processing the path. The method 900 then proceeds to step 916. At step 916, the PS unit 390 and the ROP unit 395 complete the rendering pass, and the method 900 terminates.

In sum, in one instance, the rasterizer unit applies different edge rules to the edges of a primitive based on characteristics associated with the path. In particular, in the path stenciling pass, the rasterizer unit selects which edge rule to apply to each edge based on whether the edge is shared between different paths. If the edge is shared between different paths, then the rasterizer unit applies a primary sample edge rule to the edge. In applying the primary sample edge rule to the edge, the rasterizer unit determines whether a group of coverage samples associated with a single color sample are collectively inside or outside the edge based on the position of a single coverage sample—the primary sample. By contrast, if the edge is not shared, then the rasterizer unit applies an independent sample edge rule to the edge. In applying the independent sample edge rule to the edge, the rasterizer unit determines whether each coverage sample is inside or outside the edge based on the position of the coverage sample. Subsequently, for each coverage sample, if the rasterizer unit determines that the coverage sample is inside each edge associated with the primitive, then the rasterizer unit determines that the coverage sample is covered by the primitive.

Similarly, in the path covering pass, the rasterizer unit selects which edge rule to apply to each edge of the primitive based on whether the edge is internal to the primitive. If the edge is internal to the primitive, then the rasterizer unit applies the primary sample edge rule to the edge. By contrast, if the edge is not internal to the primitive, then the rasterizer unit applies an any sample edge rule to the edge. In applying the any sample edge rule to the edge, if the rasterizer unit determines that the position of any coverage sample associated with a color sample is inside the edge, then the rasterizer unit determines that all of the coverage samples associated with the color sample are inside the edge. Again, for each coverage sample, if the rasterizer unit determines that the coverage sample is inside all of the edges associated with the particular primitive, then the rasterizer unit determines that the coverage sample is covered by the primitive.

In a second instance, when rendering indexed geometry, the device driver repurposes the most significant bits included in an index buffer entry to store edge flags. In general, a series of sequential index buffer entries included in an index buffer define a primitive. For instance, a series of three sequential index buffer entries define a triangle primitive. The device driver designates M bits of an N-bit index buffer entry to store edge flags, and (N−M) bits of the index buffer entry to store a vertex index. As is well-known, the vertex index is an index into a vertex buffer containing vertex data. In path rendering, the semantics of the edge flags varies depending on the rendering pass. During the path stenciling pass, an activated most-significant bit in a particular index buffer entry indicates that the primitive edge originating from the associated vertex index is shared between two or more paths. During the path covering pass, an activated most-significant bit in a particular index buffer entry indicates that the primitive edge originating from the associated vertex index is internal to the primitive.

In a third instance, the device driver may reprogram the positions of secondary coverage samples based on characteristics associated with the path. The device driver performs any such reprogramming before the rasterizer unit processes paths as part of either the path stenciling or the path covering passes. In particular, before rasterizing a particular path, if the device driver determines that a particular path includes one or more edges that are shared between multiple paths, then the device driver co-locates the coverage sample positions associated with each color sample. In operation, for each coverage sample group, the device driver reprograms each of the secondary sample positions to match the primary sample position. After the rasterizer unit performs operations associated with the path stenciling or the path covering pass, the device driver restores the secondary samples to their original positions.

One advantage of the above approaches is that conflation artifacts associated with edges that are shared between different paths are reduced. In particular, for each shared edge, the rasterizer unit sets each group of coverage samples associated with a particular color sample to be either fully covered or fully uncovered by each primitive. Consequently, rasterizing primitives that include shared edges does not produce partial coverage that causes background bleeding when rendering using more coverage samples per pixel than color samples per pixel. Further, rendering using more coverage samples than color samples reduces memory consumption and memory bandwidth use compared to prior-art techniques in which the number of color samples is increased to match the number of coverage samples. In one aspect of the above approaches, memory consumption is further optimized by repurposing bits included in the index buffer to store edge flags. Consequently, the disclosed approaches enable memory-efficient path rendering operations without the shared edge conflation artifacts typically associated with prior-art techniques.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A computer-implemented method for rasterizing geometric primitives, the method comprising:
   determining a rasterization state associated with a plurality of geometric primitives;
   selecting a first sample rule from a plurality of sample rules based on the rasterization state, wherein the first sample rule determines coverage of a plurality of coverage samples based on the position of a first coverage sample included in the plurality of samples;
   determining whether the first coverage sample is considered to be inside a first edge of a first geometric primitive included in the plurality of geometric primitives based on the first sample rule; and
   determining, via a graphics processing pipeline, whether the first coverage sample is considered to be covered by the first geometric primitive based on whether the first coverage sample is considered to be inside the first edge.

2. The method of claim 1, wherein both the first coverage sample and a second coverage sample are associated with a first color sample.

3. The method of claim 2, wherein the positions of both the first coverage sample and the second coverage sample are programmable.

4. The method of claim 3, further comprising determining whether the second coverage sample is considered to be inside the first edge.

5. The method of claim 4, wherein determining whether the second coverage sample is considered to be inside the first edge comprises:
   updating the position of the second coverage sample from an original position to the position of the first coverage sample based on the first sample rule; and
   calculating whether the position of the second coverage sample resides within the geometric primitive relative to the first edge.

6. The method of claim 2, further comprising determining whether the second coverage sample is considered to be covered by the first geometric primitive based on whether the first coverage sample is considered to be covered by the first geometric primitive.

7. The method of claim 2, further comprising compositing a color value for the first color sample based on whether the first coverage sample and the second coverage sample are considered to be covered by the first geometric primitive.

8. The method of claim 1, wherein the plurality of geometric primitives comprises a first path that is being rendered.

9. The method of claim 8, wherein the rasterization state indicates that at least one edge of the first path is shared with a second path that is being rendered.

10. A non-transitory computer-readable storage medium including instructions that, when executed by a processing unit, cause the processing unit to rasterize geometric primitives by performing the steps of:
    determining a rasterization state associated with a plurality of geometric primitives;
    selecting a first sample rule from a plurality of sample rules based on the rasterization state, wherein the first sample rule determines coverage of a plurality of coverage samples based on the position of a first coverage sample included in the plurality of coverage samples; and
    processing the first coverage sample based on the first sample rule.

11. The non-transitory computer-readable storage medium of claim 10, wherein both the first coverage sample and a second coverage sample are associated with a first color sample.

12. The non-transitory computer-readable storage medium of claim 11, wherein the positions of both the first coverage sample and the second coverage sample are programmable.

13. The non-transitory computer-readable storage medium of claim 12, further comprising determining whether the second coverage sample is considered to be inside the first edge.

14. The non-transitory computer-readable storage medium of claim 13, wherein determining whether the second coverage sample is considered to be inside the first edge comprises:
    updating the position of the second coverage sample from an original position to the position of the first coverage sample based on the first sample rule; and
    calculating whether the position of the second coverage sample resides within the geometric primitive relative to the first edge.

15. The non-transitory computer-readable storage medium of claim 11, further comprising determining whether the second coverage sample is considered to be covered by the first geometric primitive based on whether the first coverage sample is considered to be covered by the first geometric primitive.

16. The non-transitory computer-readable storage medium of claim 11, further comprising compositing a color value for the first color sample based on whether the first coverage sample and the second coverage sample are considered to be covered by the first geometric primitive.

17. The non-transitory computer-readable storage medium of claim 10, wherein the plurality of geometric primitives comprises a first path that is being rendered.

18. The non-transitory computer-readable storage medium of claim 17, wherein the rasterization state indicates that at least one edge of the first path is shared with a second path that is being rendered.

19. A computing device configured to rasterize geometric primitives, the computing device comprising:
    a memory;
    a processing unit coupled to the memory and configured to implement at least a portion of a graphics processing pipeline, wherein the at least a portion of the graphics processing pipeline is configured to:
       determine a rasterization state associated with a plurality of geometric primitives;
       select a first sample rule from a plurality of sample rules based on the rasterization state, wherein the first sample rule determines coverage of a plurality of coverage samples based on the position of a first coverage sample included in the plurality of samples; and
       process the first coverage sample based on the first sample rule.

20. The computing device of claim 19, wherein the positions of both the first coverage sample and a second coverage sample are programmable, and the system further comprises a device driver coupled to the processing unit, wherein the device driver updates the position of the second coverage sample from an original position to the position of the first coverage sample based on the first sample rule.

21. The computing device of claim 19, wherein a second coverage sample is considered to be covered by the first geometric primitive based on applying a sample mask to the second coverage sample, and the sample mask reflects whether the first coverage sample is considered to be covered by the first geometric primitive.

22. The computing device of claim 19, wherein the at least a portion of the graphics processing pipeline is further configured to:
    process the first coverage sample by determining whether the first coverage sample is considered to be inside a first edge of a first geometric primitive included in the plurality of geometric primitives based on the first sample rule; and determine whether the first coverage sample is considered to be covered by the first geometric primitive based on whether the first coverage sample is considered to be inside the first edge.

\* \* \* \* \*